(12) United States Patent
Dagher

(10) Patent No.: US 7,692,417 B2
(45) Date of Patent: Apr. 6, 2010

(54) SWITCHED MODE POWER CONVERTER

(75) Inventor: Elias Hani Dagher, Aliso Viejo, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 723 days.

(21) Appl. No.: 11/230,370

(22) Filed: Sep. 19, 2005

(65) Prior Publication Data

US 2007/0063682 A1    Mar. 22, 2007

(51) Int. Cl.
G05F 1/00    (2006.01)
(52) U.S. Cl. .................................. 323/285; 323/288
(58) Field of Classification Search .............. 323/222, 323/282–290
See application file for complete search history.

(56) References Cited

U.S. PATENT DOCUMENTS

| | | | | |
|---|---|---|---|---|
| 4,326,245 A * | 4/1982 | Saleh | ........................... | 363/79 |
| 4,987,606 A | 1/1991 | Ozeki et al. | | |
| 5,170,333 A * | 12/1992 | Niwayama | ............... | 363/21.11 |
| 5,179,353 A | 1/1993 | Miyake | | |
| 5,568,044 A * | 10/1996 | Bittner | ........................ | 323/272 |
| 5,959,443 A * | 9/1999 | Littlefield | .................... | 323/287 |
| 5,991,172 A * | 11/1999 | Jovanovic et al. | ......... | 363/21.14 |
| 5,994,885 A * | 11/1999 | Wilcox et al. | ............... | 323/285 |
| 6,009,000 A | 12/1999 | Siri | | |
| 6,043,633 A * | 3/2000 | Lev et al. | ..................... | 323/222 |
| 6,108,527 A | 8/2000 | Urban et al. | | |
| 6,130,579 A | 10/2000 | Iyer et al. | | |
| 6,163,142 A * | 12/2000 | Tsujimoto | .................... | 323/283 |
| 6,172,567 B1 | 1/2001 | Ueno et al. | | |
| 6,300,837 B1 | 10/2001 | Sowlati et al. | | |
| 6,307,356 B1 * | 10/2001 | Dwelley | ...................... | 323/282 |

(Continued)

FOREIGN PATENT DOCUMENTS

DE        196 23 930        12/1997

(Continued)

OTHER PUBLICATIONS

S. Howimanporn et al.; "Performance Comparison of Continuous Conduction Mode (CCM) and Discontinuous Conduction Mode (DCM) Flyback Converters"; Nov. 17-20, 2003; IEEE, vol. 2, pp. 1434-1438.*

(Continued)

*Primary Examiner*—Jessica Han
*Assistant Examiner*—Emily Pham
(74) *Attorney, Agent, or Firm*—Weide & Miller, Ltd.

(57) ABSTRACT

A voltage converter having a controller capable of maintaining stable operation of a voltage converter over multiple modes of operation. The voltage converter provides a feedback signal to an error signal generator. One or more controllers, which are selectively established as part of the feedback loop, process the error signal to generate a voltage converter charging cycle control signal. A pulse width modulator may be utilized to generate a voltage converter switch control signal that controls the charge cycle. A detector or comparator monitors one or more aspects of operation of the control circuit or the voltage converter to detect changes in the mode of operation. Upon detection of a change, the detector or comparator generate a multi-mode control signal to selectively switch one or more sub-controllers into or out of the feedback loop to thereby maintain desired stability, loop bandwidth, and response time.

19 Claims, 8 Drawing Sheets

U.S. PATENT DOCUMENTS

| | | | |
|---|---|---|---|
| 6,333,677 B1 | 12/2001 | Dening | |
| 6,411,064 B1 * | 6/2002 | Brink | 320/166 |
| 6,433,525 B2 * | 8/2002 | Muratov et al. | 323/282 |
| 6,577,110 B2 * | 6/2003 | Van Auken | 323/282 |
| 6,683,494 B2 | 1/2004 | Stanley | |
| 6,771,128 B1 | 8/2004 | Yamashita et al. | |
| 6,873,211 B1 | 3/2005 | Thompson et al. | |
| 6,944,034 B1 | 9/2005 | Shteynberg et al. | |
| 6,958,920 B2 * | 10/2005 | Mednik et al. | 363/19 |
| 7,030,596 B1 * | 4/2006 | Salerno et al. | 323/282 |
| 7,098,632 B2 * | 8/2006 | Chen et al. | 323/222 |
| 7,245,113 B2 * | 7/2007 | Chen et al. | 323/271 |
| 2005/0258808 A1 * | 11/2005 | Chen et al. | 323/222 |
| 2006/0197583 A1 * | 9/2006 | Yen et al. | 327/536 |
| 2006/0220622 A1 * | 10/2006 | Yamanaka et al. | 323/267 |

FOREIGN PATENT DOCUMENTS

| | | |
|---|---|---|
| EP | 1 076 403 | 2/2001 |
| GB | 2 294 168 | 4/1996 |
| GB | 2 389 253 | 12/2003 |
| WO | WO 99/25064 | 5/1999 |
| WO | WO 02/084935 | 10/2002 |

OTHER PUBLICATIONS

C. Basso; "Keep Your Switch Mode Supply Stable with a Critical-Mode Controller"; Nov 1997; Motorola Semiconductors; pp. 1-9.*

Isao Furukawa, et al., "A Synchronous, Step-Down From 3.6V to 1.0V, 1MHz PWM CMOS DC/DC Converter", Chou University, Tokyo, Japan, 20 pages.

Barry Arbetter, et al., "DC-DC Converter with Fast Transient Response and High Efficiency for Low-Voltage Microprocessor Loads", 1998 IEEE, pp. 156-162.

C.K. Lau, et al., "DSP Based Fuzzy Controlled Power Converter Operating in Both Continuous and Discontinuous Conduction Modes", 1996 IEEE, pp. 1530-1535.

A. Barrado, et al., "Fast Transient Response with Combined Linear-Non-Linear Control Applied to Buck Converters", 2002 IEEE, pp. 1587-1592.

K.D. Purton, et al., "Non-Linear Fuzzy Logic Control of a PWM Inverter with a Non-Linear Load", 2000 IEEE, pp. 229-234.

Jinwen Xiao, et al., "An Ultra-Low-Power Digitally-Controlled Buck Converter IC for Cellular Phone Applications", 2004 IEEE, pp. 383-391.

* cited by examiner

SWITCHED MODE POWER CONVERTER

FIELD OF THE INVENTION

The invention relates to voltage regulation and in particular to a method and apparatus for multi-mode voltage regulation.

RELATED ART

The electronic devices, circuits, and sub-systems with an electronic device may require different voltage to achieve desired operation. For example, within a portable electronic device, such as a mobile telephone or a music player, the analog systems may require a different supply voltage than the digital systems. By way of example, the analog power amplifier may require a 3.2 volt supply voltage while a digital portion of the device may only require 1.8 volts.

To maintain battery efficiency and insure compatibility with existing battery technology, batteries often supply a voltage of 3.9 to 4.5 volts, while individual cells often supply 1.5 volts per cell. To satisfy the various different voltage level requirements within a portable electronic device, it is necessary to convert the voltage levels from the battery, or other source, to the desired voltage level utilized by the electronic systems.

In addition, these issues apply to all electronic devices, not just battery operated or portable electronic devices. Power converters are utilized in many types of applications and devices.

FIG. 1 illustrates a prior art voltage conversion system. This prior art voltage converter 100 includes a battery node 104 at a supply voltage of 2.9 to 4.5 volts. A load 112, in this example embodiment a digital signal processor (DSP), requires a supply voltage of 1.2 to 1.8 volts, depending on the technology and design of the DSP. Providing a supply voltage to the DSP at the desired voltage requires that the resistor 108 be sized, to drop sufficient voltage across it, thereby providing the desired voltage. In this example embodiment, if the battery 104, at 4.5 volts, is to supply 1.2 volts to the load 112, then 3.3 volts must be dropped across the resistor 108. Due to conservation of charge, the full current draw from the battery is occurring across both the resistor 108 and the load 112 during operation of the load. As can be appreciated, this system and method for voltage conversion is inefficient due to current consumption by the resistor 108 which is wasted as heat energy.

To overcome these drawbacks and provide a more efficient method of voltage conversion, voltage converters, which intermittently connect an inductor/capacitor circuit (ICC) to the battery or other power source, are utilized. The ICC stores a charge such that it consumes current from the battery only when intermittently connected to the battery. The ICC is configured for a particular load, voltage range and supply current. This reduces power consumption but undesirably creates other problems that arise when the load voltage requirements vary.

FIG. 2 illustrates an example embodiment of a switching power converter. As shown, a supply voltage V+ 204 is selectively switched using switch 208 to connect the supply voltage to a diode 212 and an inductor 216. The diode 212 serves as a current gate having an opposing terminal connected to ground. The opposing terminal of the inductor 216 connects to a capacitor 220 and the load 224, shown as a resistor. $I_L$ is the current flowing through the inductor 216 and $I_{LOAD}$ is the current consumed by the load 224.

In operation, closing of switch 208 connects the circuit to the voltage source 204 which charges the inductor 216 and the capacitor 220 by drawing current from the source. This establishes $V_{out}$ at the desired voltage, based on the duty cycle of the switch on time 224. After the charging is complete or after sufficient charge has accumulated on the capacitor 220, the switch 208 may be returned to the open position. The load 224 continues to require voltage and draw current from the circuit, namely the charge on the capacitor 220. The inductor 216 serves to smooth current flow. The diode 212 allows the inductor current to continue to flow towards the load while the switch is open and prevents reverse inductor current from flowing. In one embodiment the diode 212 serves as a rectifier.

During continued operation the load 224 draws current thereby reducing charge on the capacitor 220. After a period of time, the switch 208 is again closed thereby re-charging the inductor 216 and capacitor 220. By selectively opening and closing the switch 208 the desired voltage $V_{out}$ may be maintained at the load 224 while also only intermittently drawing current from the source 204. This reduces the overall current draw from the source 204 thereby reducing power consumption.

A further drawback of the prior art is that the control loops of prior art systems are optimized for only one region of operation and thus are unable to maintain system performance at the power converter transitions to various modes of operation. In such prior art system, transitions into non-optimized regions of operation may result in reduced system performance, in-accurate operation, instability, or inefficiencies.

SUMMARY

To overcome the drawbacks of the prior art and provide additional benefits as would be understood by one of ordinary skill in the art, a multi-mode voltage converter is disclosed. To achieve operation of the voltage converter over multiple modes, such as continuous conduction mode and discontinuous conduction mode, the voltage converter monitors operation of the voltage converter and/or the load to determine a mode of operation of the voltage converter. Based on the detected mode of operation, one or more changes may be made to the voltage converter, or to a feedback loop, to maintain stability of the voltage converter, feedback loop, or both, as the voltage converter enters different stages of operation.

One exemplary method for voltage conversion in a multi-mode voltage converter comprises providing an output voltage to a load and comparing the output voltage to a reference voltage to generate an error signal. In response to a mode detection signal, this method of operation selectively processes the error signal with one or more controllers to maintain stability of the multi-mode voltage converter and to generate a voltage converter charging cycle control signal. The method then provides the voltage converter charging cycle control signal to a voltage converter circuit, whereby the voltage converter charging cycle control signal controls the duration of the charging cycle of the voltage converter circuit. This method may monitor operation of the voltage converter circuit to detect a change in the mode of operation and in response to the monitoring, generate the mode detection signal.

In one embodiment, a voltage converter charging cycle control signal is generated by a pulse width modulator that varies a pulse width to control the charge cycle. Furthermore, the monitoring operation of the voltage converter circuit to detect a change in the mode of operation may comprise monitoring $I_L$, a current in the voltage converter. In one embodiment, selectively processing the error signal comprises processing the error signal with a DCM controller during discontinuous conduction mode and with a CCM controller during continuous conduction mode.

Also disclosed herein is a method of converting a supply voltage to an output voltage to thereby power a load. In one embodiment this comprises selectively connecting a voltage converter to a supply voltage to thereby charge one or more voltage converter elements and generate the output voltage. This may occur in response to a charging cycle control signal. This method then monitors the output voltage in relation to a control voltage to generate a difference signal. Thereafter, the method provides the difference signal to a controller. For example, the controller may comprise a multi-mode controller configured to operate over multiple modes of operation. Processing of the difference signal through the controller may occur to maintain the desired operation of the voltage converter. The processing performed by the controller may be dependent on the mode of operation. The method also monitors the mode of operation of the voltage converter and, responsive to the mode of operation of the voltage converter, provides a switching signal to the controller to determine the processing performed by the controller.

In one embodiment, the controller comprises one or more digital filters which are selectively utilized to process the signal based on the mode of operation. It is contemplated that processing the difference signal through the controller may be performed by integrators, differentiators, adders, or feedback loops to calculate the next duty cycle (charge cycle control signal). The step of monitoring the mode of operation may comprise monitoring a voltage converter current and the monitoring may further comprise comparing a voltage converter current to a threshold value.

A system is contemplated which performs these methods. One such system comprises a voltage converter control circuit having a feedback loop configured to feedback an output signal and an error signal generator configured to generate an error signal based on the output signal. A mode detector is also part of the system and is configured to detect a voltage converter's mode of operation while one or more controller components are provided and configured for inclusion in the feedback loop based on the mode of operation. As part of this system, a selector, which may be responsive to the mode detector, is configured to establish one or more controller components as part of the feedback loop for processing the error signal to generate a charge cycle control signal. Accordingly, a charge cycle controller, which may be responsive to the charge cycle control signal, is configured to control a charge cycle of the voltage converter.

In one embodiment, the mode detector is configured to compare a voltage converter current value to a threshold value. In one embodiment, the mode detector comprises a current monitor configured to monitor the current through a transistor. It is also possible for one or more controller components to comprise a first controller for use during operation in discontinuous conduction mode and a second controller for use during continuous conduction mode.

In one embodiment, a voltage converter is disclosed which comprises a voltage converter circuit, capable of operation in multiple modes of operation and which is configured to selectively connect to a supply voltage to generate an output voltage to a load. As part of the voltage converter, a detector is configured to detect a mode of operation of the voltage converter circuit. In addition, a multi-mode controller having two or more modes of operation may also be provided or utilized so that the mode of operation is responsive to the mode of operation detected by the detector. Thus, the controller may generate a control signal for the voltage converter circuit that controls a charge cycle duration for the voltage controller.

To achieve one desired mode of operation, the mode of operation of the multi-mode controller is selected to maintain stability of the voltage converter circuit. In one embodiment, the detector comprises a comparator configured to compare a voltage converter current to a threshold value. One or more switches may be used to modify the multi-mode controller and one or more of the switches may be configured to be controlled by the detector to selectively control which of the two or more modes of operation the multi-mode controller is operating.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 3A:
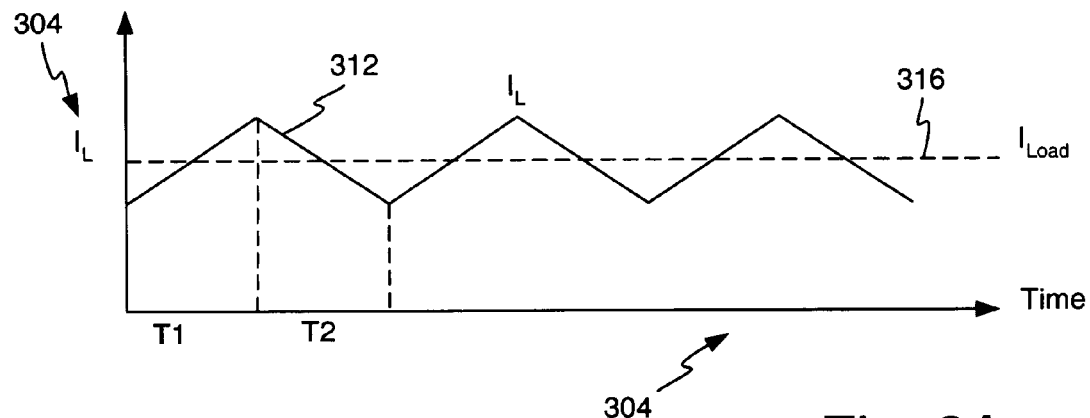
FIG. 3A illustrates a signal plot of $I_L$ during continuous conduction mode.
Figure 3B:
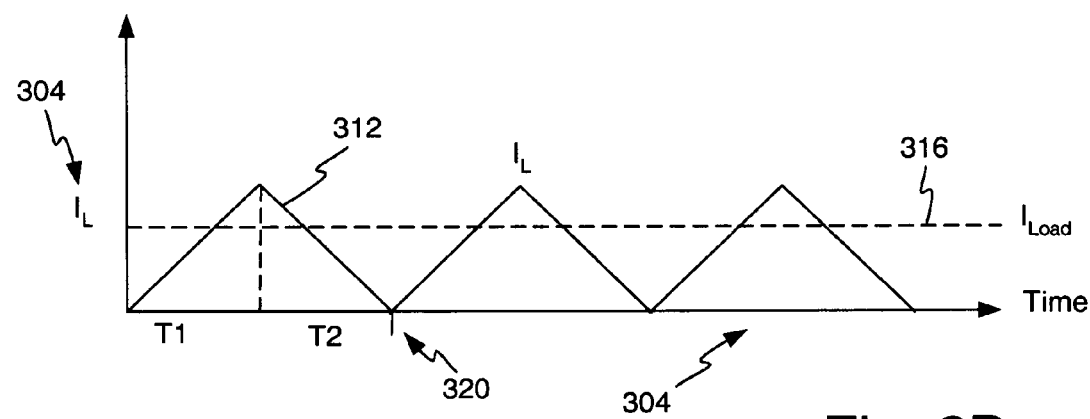
FIG. 3B illustrates a signal plot of $I_L$ during boundary conduction mode.
Figure 3C:
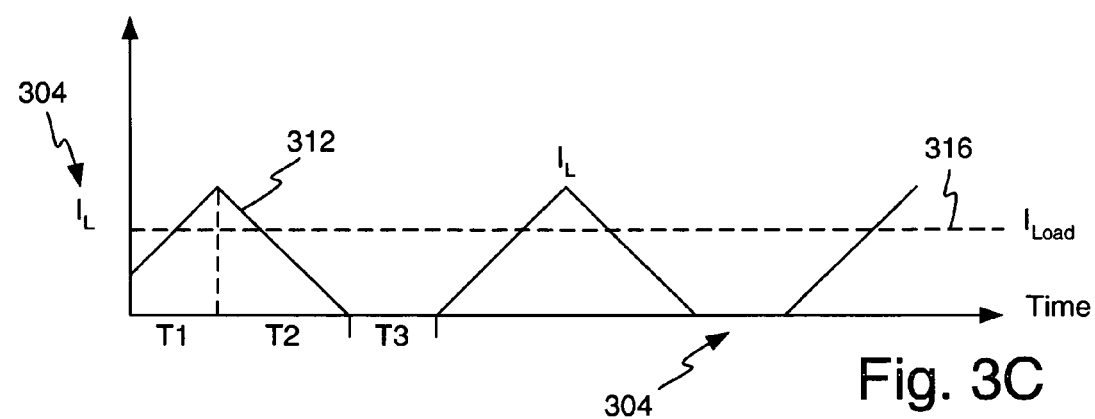
FIG. 3C illustrates a signal plot of $I_L$ during discontinuous conduction mode.

To overcome the drawbacks of the prior art and provide a more efficient, stable, and accurate voltage converter, a multi-mode voltage converter is disclosed. To gain an understanding of the benefits provided by a multi-mode voltage converter, the various modes of operation are shown in FIG. 3. The plots of FIG. 3 illustrate continuous conduction mode CCM (FIG. 3A), critical conduction mode or boundary mode (FIG. 3B), and discontinuous conduction mode DCM (FIG. 3C). In all of plots of FIG. 3, the horizontal axis 304 represents time, while the vertical axis 308 represents the magnitude of $I_L$ 312. In certain figures, a plot of $I_{LOAD}$ 316 is also shown. Each figure is discussed below.

Figure 2:
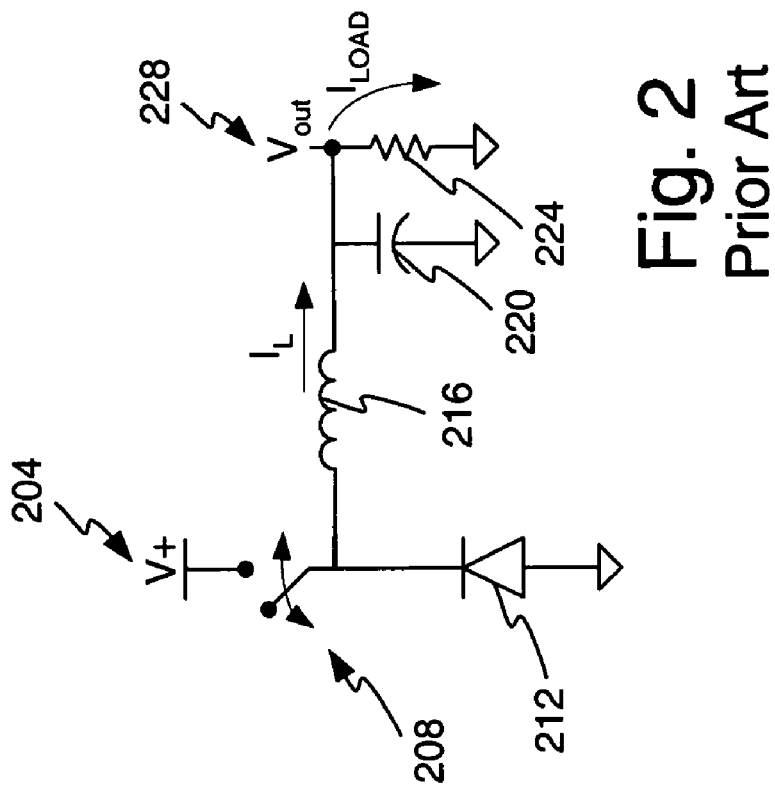
FIG. 2 illustrates a block diagram of an example embodiment of a prior art voltage converter.
Figure 1:
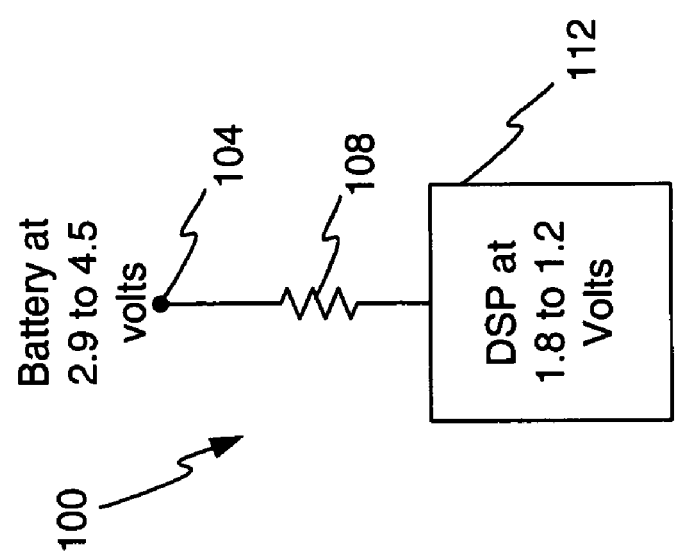
FIG. 1 illustrates a block diagram of an example embodiment of a prior art voltage converter.

In general, prior art power converters, such at that shown in FIG. 2 were designed to operate in DCM or CCM. When a prior art power converter transitioned into different modes of operation, it risked entering an unstable state of operation or becoming an un-optimized converter, such as lacking desired efficiency and transient response.

FIG. 3A illustrates continuous conduction mode. As shown, during a time T1, the switch 208 shown in FIG. 2 is closed causing the capacitor to charge. It is contemplated that the load is drawing power during all phases of operation. During time T2, the switch is open and the load continues to draw power, although power is not being drawn from the source, but instead from the charged ICC. After a period T2, the switch is again closed thereby recharging the capacitor/inductor. This mode of operation is referred to as continuous conduction mode because the inductor current is continuously supplying current ($I_L$) to the load and capacitor.

FIG. 3B illustrates a boundary mode. As shown, during a time T1, the switch shown in FIG. 2 is closed causing the capacitor to charge. It is contemplated that the load is drawing power during all phases of operation. During time T2, the switch is opened and the load continues to draw power, although power is not being drawn from the source but instead from the capacitor. After a period T2, the switch is again closed thereby recharging the capacitor/inductor. This mode of operation is referred to as boundary mode because the circuit, although continuously supplying current ($I_L$) to the load, closely approaches, touches, or slightly exceeds the boundary, shown as the horizontal axis 304, when $I_L$ is zero 320, or close to zero.

FIG. 3C illustrates discontinuous conduction mode. As shown, during a time T1, the switch shown in FIG. 2 is closed causing the capacitor to charge. During time T2, the switch is open and the load continues to draw power, although power is not being drawn from the source, but instead from the ICC. The amount of power being drawn by the load and the particular duty cycle value causes $I_L$ to decrease to zero as shown. After a period T2, and during period T3, the circuit is in discontinuous conduction mode wherein $I_L$ is at zero. During this period the behavior of the circuit is such that the load is pulling current exclusively from the capacitor. The control circuit merely continues to monitor the system. Thereafter, the switch is again closed thereby recharging the capacitor/inductor. This mode of operation is referred to as discontinuous conduction mode because the inductor enters periods of non-conduction.

During these different phases of operation of a power converter circuit, the load is exhibiting different behavior and the current flow within the circuit is likewise varying. The controller(s) of the method and apparatus disclosed herein senses these load changes and appropriately calculates the new charge cycle control values. As an advantage over the prior art, the controllers are selectively switched and tailored for multi-mode operation.

Figure 4A:
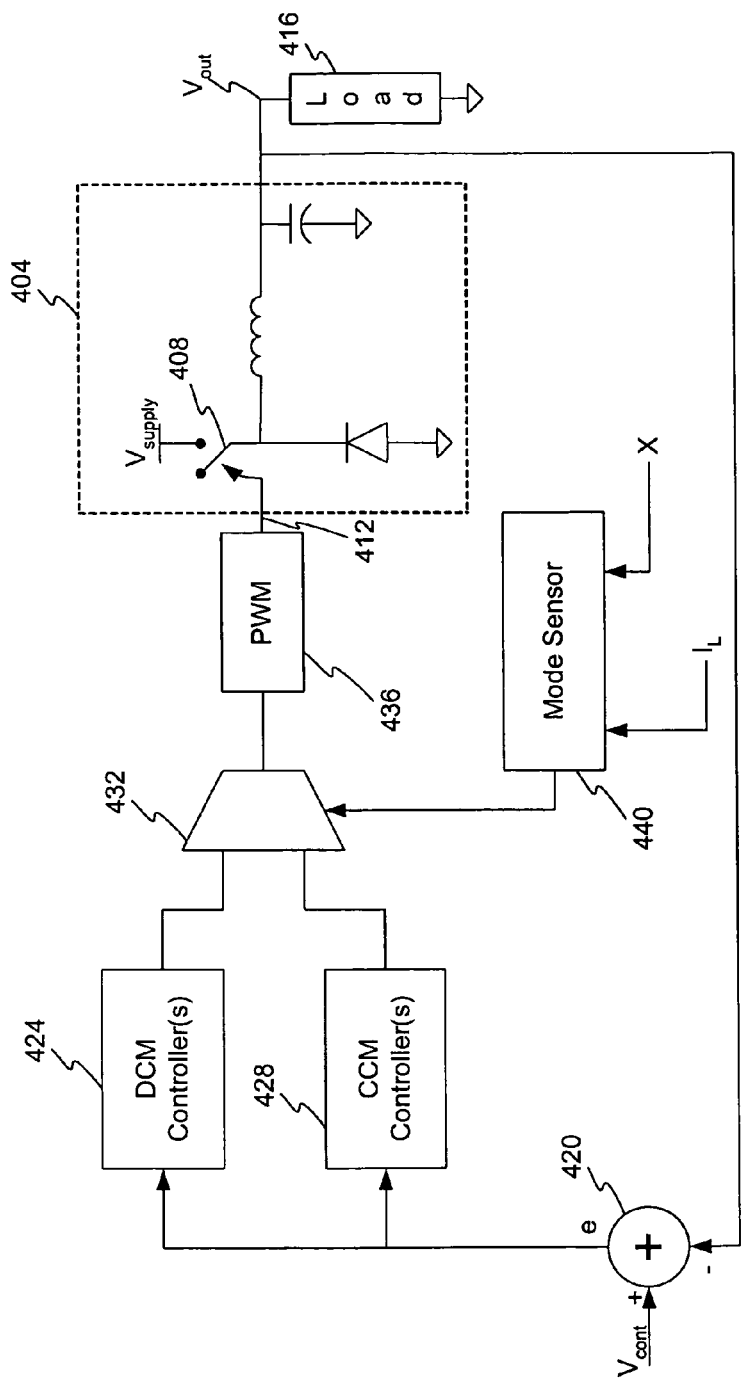
FIGS. 4A and 4B illustrate block diagrams of example embodiments of a voltage converter with a dual mode controller.
Figure 4B:
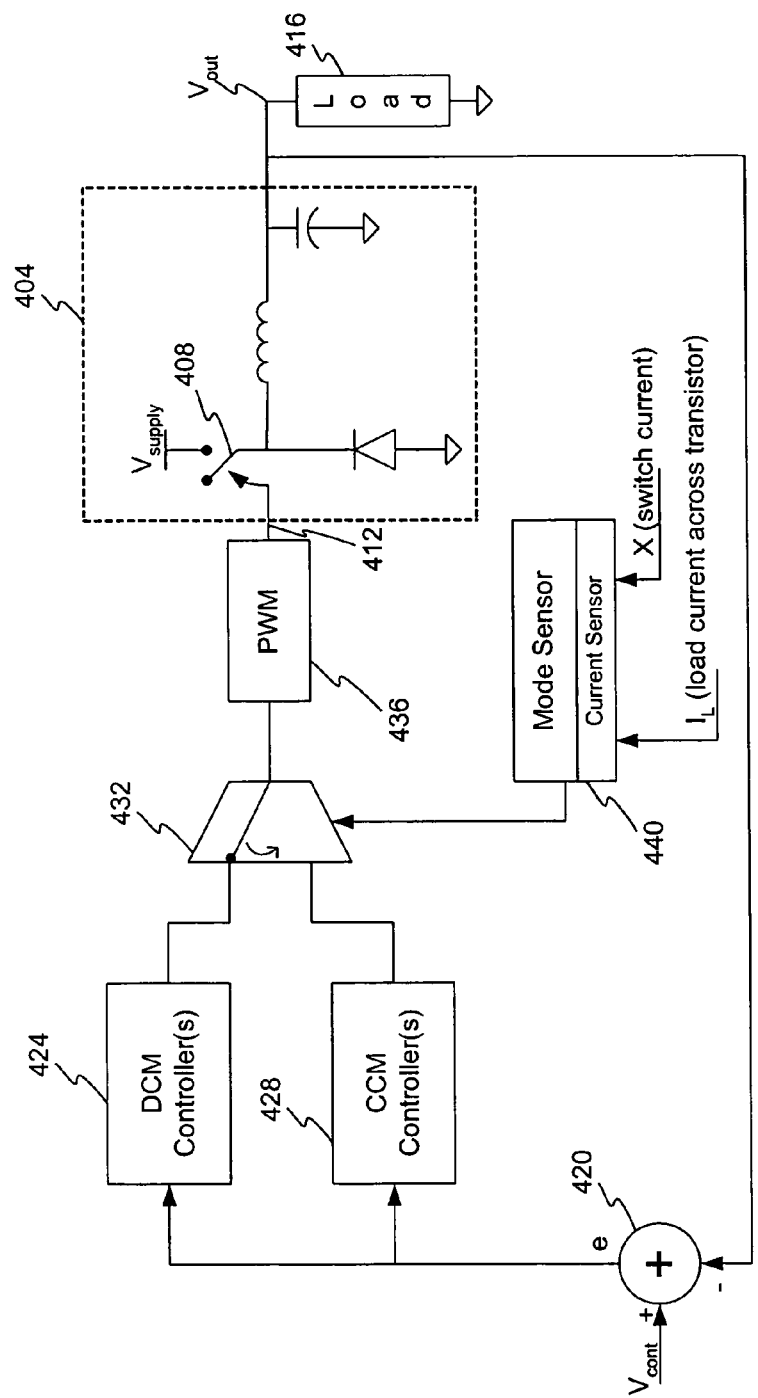

FIG. 4 illustrates an example embodiment of a multi-mode voltage converter, which may also be referred to as a switch mode power converter. This is but one possible embodiment and as such, it is contemplated that the switched mode power converter may be utilized in any application to convert power from one source that is at a specific voltage to another output at a voltage different from the source. As shown in FIG. 4, a voltage converter circuit 404 includes a switch 408 that is controlled by switch input 412. The output of the voltage converter 404 is provided to a load 416. The general principles of the voltage converter 404 are shown and discussed above in connection with FIG. 2.

The voltage $V_{out}$ is provided to the load 416 and is fed back as a feedback signal to a comparator or subtractor 420. The summing junction 420 also receives an input $V_{cont}$, which serves as a reference or control voltage. In one embodiment, the control voltage $V_{cont}$ represents the desired voltage level to be supplied to the load, i.e. $V_{out}$. It is contemplated that this may change over time and may depend on the load or behavior of the load. The subtractor 420 generates an error signal e that represents the difference between the $V_{out}$ and $V_{cont}$.

A DCM controller 424 and a CCM controller 428 receive the error signal from the subtractor 420. The DCM controller 424 may comprise one or more controllers. The CCM controller 428 may comprise one or more controllers. The DCM controller 424 comprises one or more circuit elements that are selectively switched into the control loop, which includes the feedback signal path, to maintain desired operation and stability of the system, including the voltage converter circuit 404, during operation in DCM mode. The CCM controller 428 comprises one or more circuit elements that are selectively switched into the control loop, which includes the feedback signal path, to maintain desired operation and stability of the system, including the voltage converter circuit 404, during operation in CCM mode. In one embodiment, a multiplexer may be placed in front of the controllers 424 and 428.

In one embodiment, the DCM controller 424 and the CCM controller 428 comprise of digital filters. In one embodiment, the DCM controller 424 and the CCM controller 428 may comprise, but are not limited to one or more digital filters, state info machines, state sharing device, logic, or a controller or processor configured to utilize information regarding inductor current and/or source voltage. The controllers 424, 428 may be configured to share state information. In one embodiment, the controllers 424, 428 comprise one or more inductor, capacitors, or resistors selected and configured to maintain loop stability. In one embodiment, the controllers 424, 428 may share information, such as state information or any other type of information or data. In one embodiment, information is shared between controllers to achieve a smooth transition between controllers or modes.

The output of the controllers 424, 428 connect to a mode selector 432 which may comprise a switch, which in turn has an output connected to a modulator 436. In one embodiment, the modulator 436 comprises a pulse width modulator (PWM) configured to generate a pulse having a pulse width dependant on the inputs from the DCM controller 424, the CCM controller 428, or both. In one embodiment, the mode selector 432 combines the output from the controllers 424, 428. In another embodiment, a delta sigma or delta modulator is utilized instead of a PWM.

The output of the modulator 436 is provided to the voltage converter 404 via input 412 to serve as the control signal for the one or more switches 408. In one embodiment, the width of a pulse from the pulse width (PW) type modulator 436 controls the duration that the switch 408 is closed and the duration that the switch is open.

Controlling the mode selector 432 is an input from a mode sensor 440 or other control device. The mode sensor 440 may comprise any configuration of hardware, software, or both configured to evaluate one or more inputs regarding the load, circuit behavior, feedback loop behavior, or any other characteristics. In one embodiment, the mode sensor 440 comprises a comparator. The comparator may compare an error signal or the present state of the power converter to a threshold or over value. Based on this evaluation, the mode sensor 440 may generate the control signal to the mode selector 432. In one embodiment, the mode sensor 440 comprises control logic configured to perform the analysis. In one embodiment, the mode sensor 440 comprises a processor.

The mode sensor 440 may receive one or more inputs which are utilized to generate the desired control signal. The inputs to the mode sensor 440 may comprise, but are not limited to $I_L$, the duty cycle, the switch frequency, $I_{load}$, inductor value, capacitor value, inductor current, capacitor voltage, error signal, external input regarding system status, and/or any other input to provide information to the mode sensor logic to generate a control signal to select the CCM or the DCM controller 424, 428.

In operation, it is assumed that $V_{out}$ is provided to the load based on the $V_{cont}$, although in other embodiments, $V_{out}$ may be based on any factor. To maintain $V_{out}$ at a value set by $V_{cont}$ and to minimize or reduce power consumption while also maintaining stability over multiple modes of operation, the subtractor 420 subtracts the feedback signal from $V_{cont}$ to generate an error signal. One or both of the DCM controller 424 and CCM controller 428 process the error signal e. In one embodiment, the processing occurs to maintain stability of the feedback loop which, absent such processing by the appropriate controller 424, 428, the loop may enter a state of instability. The switch or mode selector 432 controls which controller 424, 428 is part of the feedback loop based on the signal from the mode sensor 440. It is contemplated that DCM controller 424 is configured for operation in DCM mode while CCM controller 428 is configured for operation in CCM mode.

The mode sensor 440 determines which controller 424 to include in the feedback loop by generating and providing the mode selector control signal to the mode selector 432. In one embodiment, the mode sensor 440, which may comprise any type logic or processing element, determines the mode in which the voltage converter 404 is operating by processing or comparing the inputs, such as for example input $I_L$ or input X, which may comprise, but are not limited to $I_L$, the duty cycle, the switch frequency, $I_{load}$, inductor value, capacitor value, inductor current, capacitor voltage, error signal, external input regarding system status, and/or any other input to provide information to the mode sensor logic to generate a control signal to select the CCM or the DCM controller 424, 428.

Based on this determination, the mode sensor 440 controls which controller(s) 424, 428, are configured as part of the feedback loop. The mode sensor 440 may utilize any means to determine which mode the voltage controller is presently operating or the comparator may be provided this information from a system component.

In one example embodiment, the comparator received one or more items of data, values, or signals and compares the one or more items of data, values, or signals to one or more other items of data, values, or signals or to a threshold or both. Based on a comparison or other processing, the mode sensor 440 may determine which mode of operation the system is in, and then switch in the proper controller 424, 428 to match the mode of operation.

It is also contemplated that comparator may select which controller to utilize in the system based on factors other than whether the voltage converter is in DCM mode or CCM mode. For example, to maintain desired $V_{out}$ and stability it may be preferred to select or design the controller based on some other factor such as, but not limited to, transient performance or some other DCM or CCM controller configuration such as burst or pulse frequency modulation configuration.

Selection of which controller 424, 428 to switch into the circuit may also be based on a memory look up operation or program depending on the particular status of operation of the system. For example, in a wireless telephone during standby mode, one controller may be used while when in active mode, a different controller may be used. This selection may occur regardless of whether the voltage converter 404 is operating in DCM mode or CCM mode.

In one embodiment, a determination of whether operation is occurring in DCM mode or CCM mode is based on $I_L$. For example, if $I_L$ is at or near zero, then the converter 404 may be in DCM thereby necessitating a switch to incorporate the DCM controller into the feedback loop. In contrast, if $I_L$ does not approach zero then it is likely the converter is in CCM mode and the CCM controller would be the desired controller to incorporate into the feedback circuit.

Figure 5:
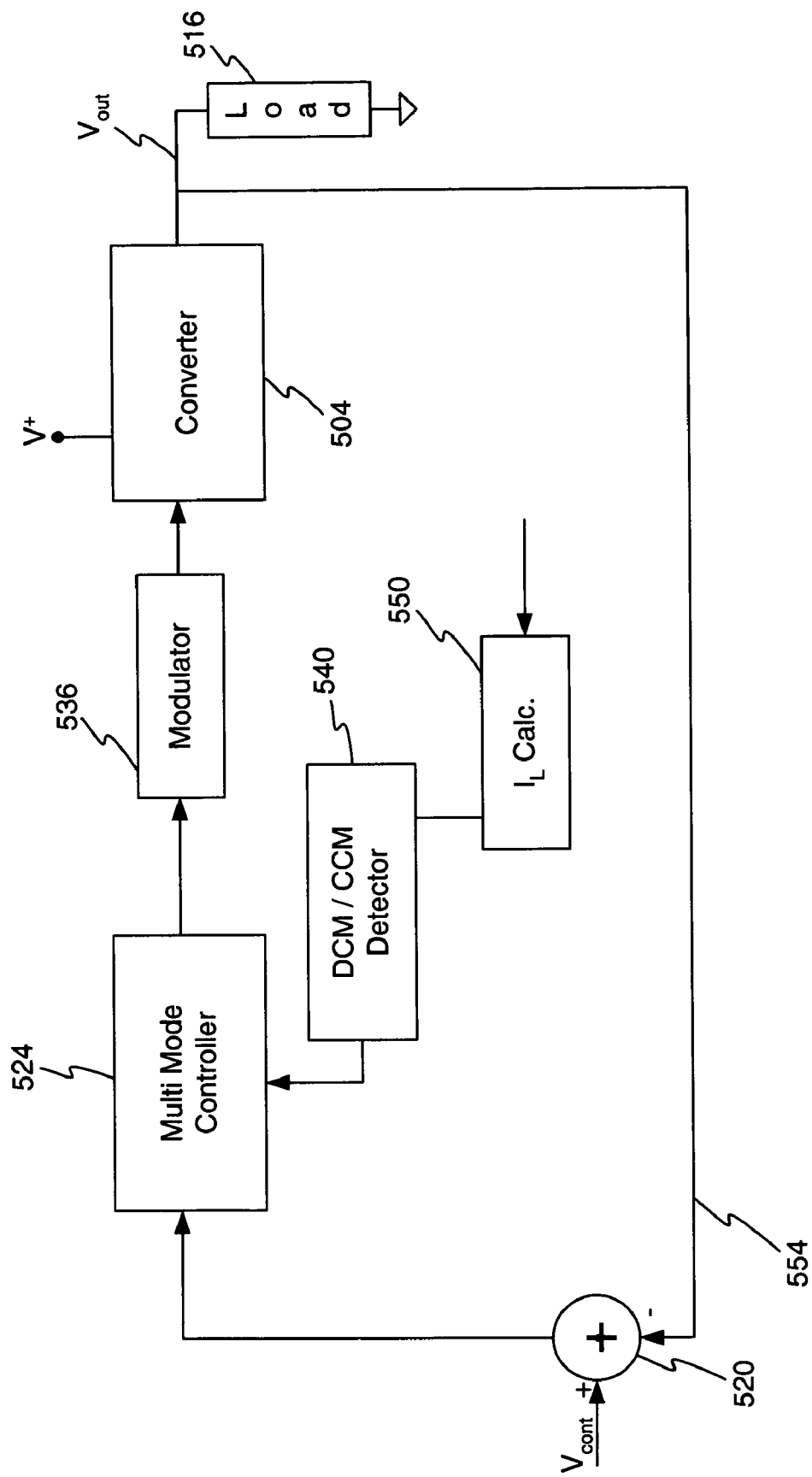
FIG. 5 illustrates a block diagram of an example embodiment of a voltage converter with a multi-mode controller.

FIG. 5 illustrates a block diagram of an alternative embodiment of the multi-mode voltage converter. This is but one possible alternative embodiment and as such, it is contemplated that one of ordinary skill in the art may arrive at an alternative embodiment that does not depart from the scope of the claims. In this example embodiment, a subtractor 520 compares $V_{out}$ on feedback path 554 to $V_{cont}$ to generate the error signal. A multi-mode controller 524 receives the error signal and generates a modulator control signal. The modulator control signal is responsive to input from a detector 540 which indicates whether they system is in DCM mode or CCM mode.

The output of the controller 524 provides a control signal to a modulator 536 that is configured to generate a signal that selectively controls the charging cycle of the converter 504.

The converter 504, which connects to supply voltage V+ generates the voltage $V_{out}$ while also reducing power consumption from the supply voltage. The load 516 connects to the output of the converter 504 and path 554 comprises the feedback path to the subtractor 520.

In operation it is contemplated that two or more modes of operation may be entered and as such the controller 524 may be configured to selectively alter its feedback path character to accommodate these two or more modes of operation. In one embodiment, the multi-mode controller comprises one or more digital or analog filters blocks that may be selectively switched into or out of the feedback loop to provide the desired level of feedback to maintain stability of the loop and provide the desired feedback signal modification. Thus, although a single controller element 524 is shown, it is contemplated that within the block there may exist numerous signal paths and processing elements which may be electively switched into and out of the circuit to provide the desired loop response.

The various processing blocks shown in FIG. 5 may comprise varying groups or modules of digital filter or resistor-capacitor-inductor banks. In general, the multi-mode controller 524 may be configured in any manner to provide stability and desired operation of the feedback loop and voltage conversion over multiple modes of operation.

In one embodiment, the detector 540, which is configured to detect the mode of operation and selectively enable the multi-mode controller, receives an input from an $I_L$ calculation module 550. The $I_L$ calculation module 550 comprises hardware, software, or a combination of both configured to generate the value of $I_L$. In one embodiment, the $I_L$ calculation module 550 comprises detectors that monitor the behavior of one or more devices in the voltage converter 504.

Figure 6:
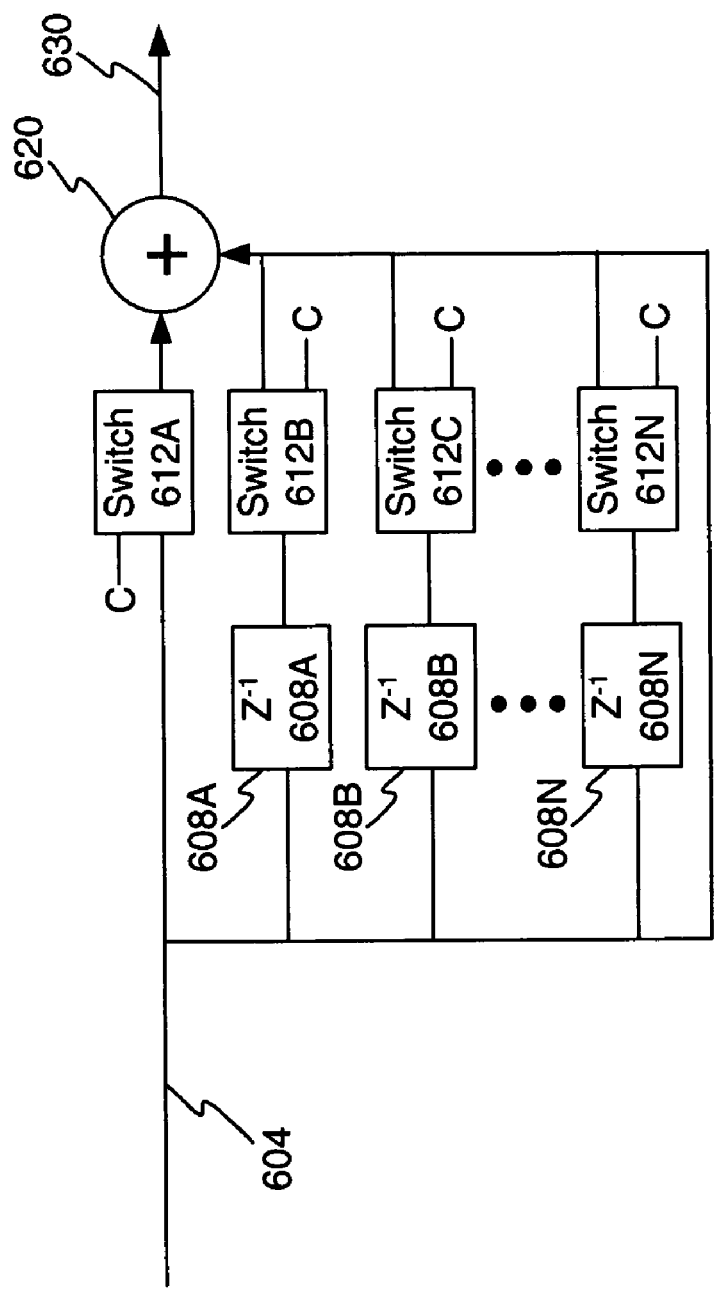
FIG. 6 illustrates a block diagram of an example embodiment of a multi-mode controller.

FIG. 6 illustrates an example embodiment of a multi-mode controller. This is but one possible example embodiment of a multi-mode controller and as such, it is contemplated that one of ordinary skill in the art may develop other controller configurations which, although configured differently, do not depart from the scope of the claims. In this embodiment a controller input is distributed to multiple sub-controllers 608A-608N, where N comprises any whole number. The sub-controllers 608 may comprise digital filters, delays, resistor, capacitor, and/or inductor networks. In other embodiments the sub-controllers 608 may comprise other types of mode controllers or any other type of circuit or element that performs as described herein. It is also contemplated that analog filters may be utilized instead of or in addition to digital filters.

The output of the sub-controllers 608 connect to switch elements 612A-612N, which in turn have an output that connects to a summing junction 620. The switches 612 may include a control input that controls the status of the switch, i.e. open or closed. The summing junction 620 combines the various inputs to generate a composite output signal on output 630.

In operation, an external circuit, such as the mode sensor 440 or the detector 540, generates and provides a control signal to the control input C of the one or more switches 612. In one embodiment, the switches 612 may be individually opened or closed to create the desired circuit configuration. The signal received at the input 604 is provided to the sub-controllers 608 which may optionally be included in the circuit based on the status of the switches 612. After processing by the sub-controllers 608, the signals that are allowed to pass through the switches 612 to the summing junction 620 are combined to create the output signal on output 630. In one embodiment, the output signal is provided to a modulator, such as a pulse width modulator, as shown in FIG. 4. As a result of selectively switching the sub-controllers 608 into the feedback loop, the loop has the desired properties, which when part of the feedback loop, creates a stable circuit which has the desired loop bandwidth, response time, noise suppression, and efficiency.

It is further contemplated that the principles disclosed herein may be applied not only to a step down voltage regulator, such as a buck converter, but also to a step up voltage regulator, such as for example a boost converter. In addition, any combination of a step up and step down converter may be enabled based on the teachings contained herein. It is contemplated that one of ordinary skill in the art, having reviewed the detailed description and figures, may enable such a step up voltage regulator and, as such, such an embodiment is not discussed in detail herein.

Figure 7A:
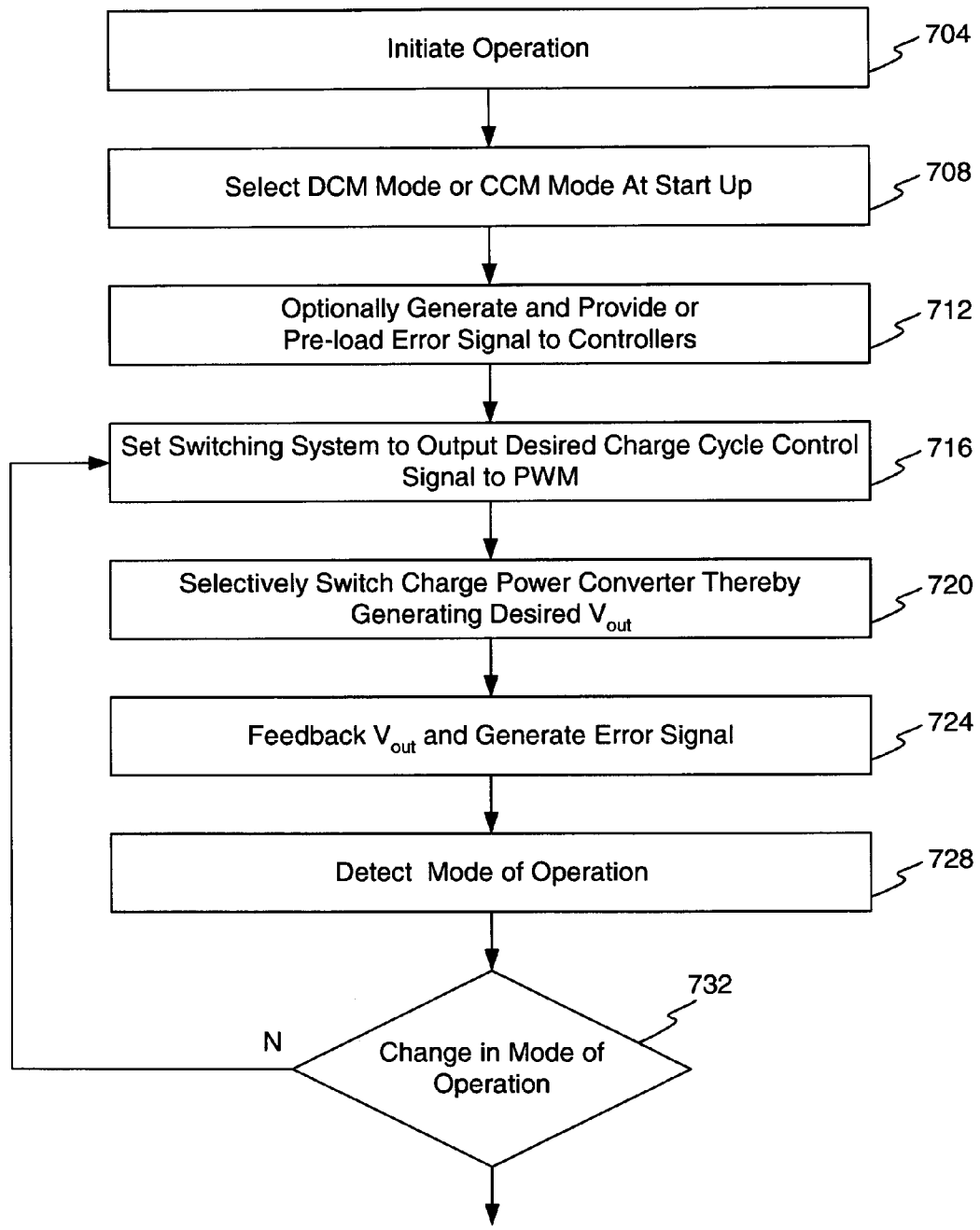
FIG. 7 illustrates an exemplary flow diagram of an example method of operation.

FIG. 7 illustrates an operational flow diagram of an example method of operation. This is but one possible method of operation and, as such, it is contemplated that other methods of operation may be developed that do not depart from the claims that follow.

In this example method of operation, at a step 704, the system initiates operation. It is contemplated that at start-up the device may automatically enter into a known mode of operation. In this example embodiment, at a step 708, the operation selects DCM mode or CCM mode. In addition, other modes of operation may be entered into at start-up. In other embodiments, other actions may occur at start-up, such as but not limited to, a soft startup or a ramp up.

At a step 712, the system may optionally generate or pre-load the error signal(s) to the controller. For example, when the controller comprises one or more digital filters, the digital filters may need to be pre-loaded with tap values. Thereafter, at a step 716 the multi-mode controller sets the switch to output the desired duty cycle control signal to the pulse width modulator (PWM). The output of the pulse width modulator controls the charge cycle in the voltage regulator as described above. In one embodiment, a device other than a PWM is utilized to control the voltage regulator charge cycle. Accordingly, the multi-mode controller may control the charge cycle directly or use another acceptable device or system.

At a step 720, the system selectively controls the voltage regulator switching element. In one embodiment, this comprises selectively switching the charge power converter to thereby generate the desired output voltage. In one embodiment, the switch is controlled to selectively charge the voltage converter to thereby generate the desired output voltage ($V_{out}$) while concurrently minimizing power consumption. It is contemplated that a device other than a switch, within the voltage converter, may be utilized to regulate the charging cycle. Other devices that may be utilized include, but are not limited to, Power FET, BJT, or any semiconductor. Operation of the voltage converter is generally understood and hence not described in detail. Use of the multi-mode controller maintains desired stability, loop bandwidth and response time.

At a step 724 the voltage converter generates the $V_{out}$ signal for the load. The $V_{out}$ is fed back to the control loop as a feedback signal. Based on the desired output signal and the actual output signal, the system generates an error signal. The error signal is provided to the multi-mode controller system.

During these phases of operation described above, a detector or comparator monitors the mode of operation of the voltage regulator. This occurs at step 728 in the operation flow diagram of FIG. 7. By monitoring which of multiple modes of operation the voltage regulator is operating, the detector or comparator is able to detect changes and generate an appropriate control signal to the multi-mode controller. The monitoring can also be done indirectly via calculations based on input data, such as inductor value, load, source voltage, and/or switching frequency. At a decision step 732, a decision occurs regarding a change in the mode of operation. If at step 732 the mode of operation has not changed, then the method returns to step 716 wherein the system maintains the same multi-mode controller configuration. For example, the detector or comparator would not change the configuration of the feedback loop of the multi-mode controller if the mode has not changed because it is contemplated that desired loop stability and bandwidth has been established.

Alternatively, if at step 732 it is determined that the mode of operation has changed then the method advances to step 736. In one example embodiment, changes in $I_L$ are detected or monitored to determine if the mode of operation has changed. In one embodiment, $I_L$ is compared to one or more threshold values to detect changes in the mode of operation.

Figure 7B:
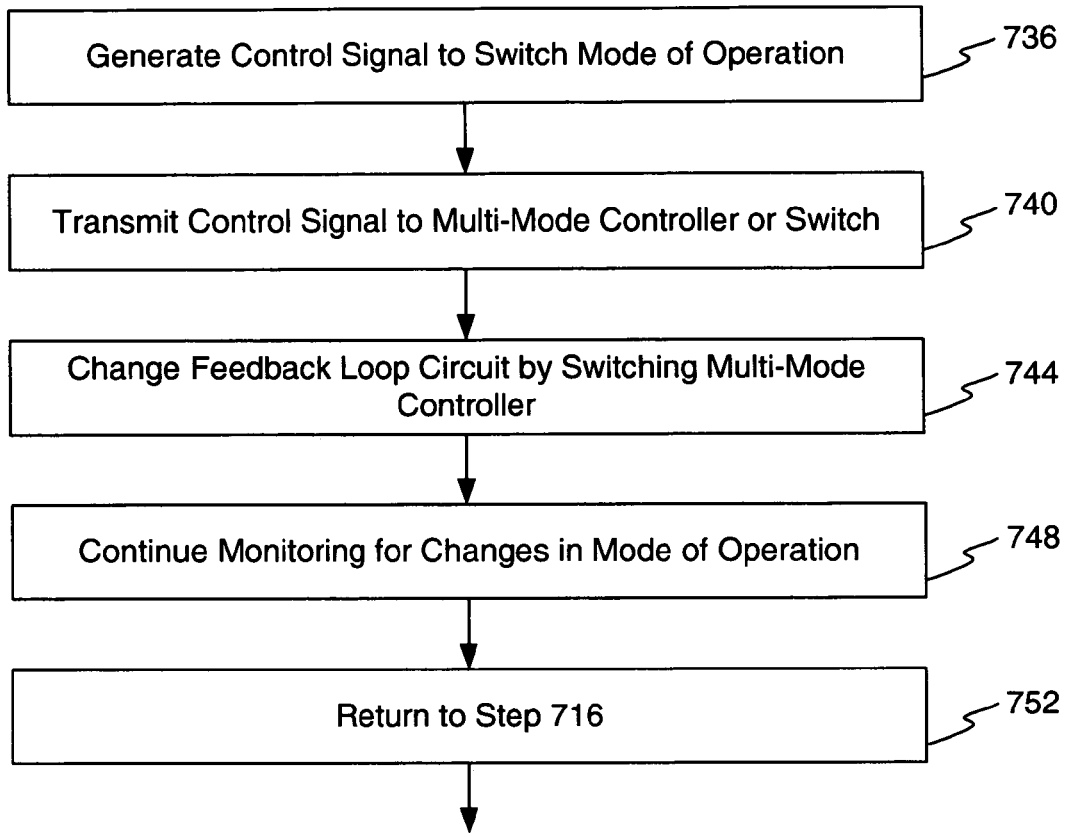

Advancing to FIG. 7B, at a step 736 the system, in response to a detected change in mode of operation, generates a control signal, which is sent to the multi-mode controller or a switch associated with the multi-mode controller.

At a step 740, the method transmits the control signal from the detector or comparator to the multi-mode controller or to a switch associated with the controller, such as switch or mode selector 432 shown in FIG. 4. This has the effect of altering the feedback loop circuit due to the switching additional circuitry, namely multi-mode controller circuitry, into or out of the feedback loop. This is shown at step 744. Consequently this establishes the desired loop transfer function, response time, bandwidth, stability, noise suppression, and/or efficiency for the loop in view of the change in mode of operation. This has the benefit of maintaining desired operation and stability while utilizing a single voltage converter. In addition, due to the inclusion of the multi-mode controller with mode change detection, the loop may be enabled in the digital domain. Unlike analog loops, which suffer from numerous disadvantages, the digital loop may be enabled and capable of operating over multiple modes. Various advantages to implementing the loop in the digital domain comprise sharing of state or more among the mode controllers, use of non-linear control modes, reductions in size of the circuitry and an immunity to process variations. In particular, analog loops have the drawback of undesirably large element size, limited modes of control, and sensitivity to process variations. Absent the multi-mode controller with detection and switching capability, a digital loop would risk instability if operated across multiple modes of operation.

At a step 748 the method continues monitoring for changes in the mode of operation to maintain desired and optimal operation. Accordingly, at step 762 the operation returns to 716 wherein the above-described steps may repeat as described above.

While various embodiments of the invention have been described, it will be apparent to those of ordinary skill in the art that many more embodiments and implementations are possible that are within the scope of this invention.

What is claimed is:

1. A method for voltage conversion in a multi-mode voltage converter comprising:
   providing an output voltage to a load;
   comparing the output voltage to a reference voltage to generate an error signal;
   responsive to a mode detection signal, selectively processing the error signal with either or both of a continuous conduction mode controller and a discontinuous conduction mode controller to thereby maintain stability during transition through critical conduction mode of the multi-mode voltage converter and generating a voltage converter charging cycle control signal;
   providing the voltage converter charging cycle control signal to a voltage converter circuit, whereby the voltage converter charging cycle control signal controls the duration of the charging cycle of the voltage converter circuit; and
   monitoring operation of the voltage converter circuit to detect a change in the mode of operation and, responsive to the monitoring, generating the mode detection signal.

2. The method of claim 1, wherein generating a voltage converter charging cycle control signal is performed by a pulse width modulator that varies a pulse width to control the charge cycle.

3. The method of claim 1, wherein monitoring operation of the voltage converter circuit to detect a change in the mode of operation comprises monitoring a current in the voltage converter.

4. The method of claim 1, wherein selectively processing the error signal comprises processing the error signal with a discontinuous conduction mode controller during discontinuous conduction mode and with a continuous conduction mode controller during continuous conduction mode.

5. A method of converting a supply voltage to an output voltage to thereby power a load comprising:
   responsive to a charging cycle control signal, selectively connecting a voltage converter to a supply voltage to thereby charge one or more voltage converter elements and generate the output voltage;
   monitoring the output voltage in relation to a control voltage to generate a difference signal, the difference signal based on the difference between the control voltage and the output voltage;
   providing the difference signal to a controller;
   processing the difference signal through the controller to thereby maintain desired operation of the voltage converter, wherein the processing performed by the controller is dependent on a mode of operation, the mode of operation including boundary conduction mode, discontinuous conduction mode, and continuous conduction mode; and
   monitoring the mode of operation of the voltage converter and, responsive to the mode of operation of the voltage converter, providing a switching signal to the controller to determine the processing performed by the controller.

6. The method of claim 5, wherein the controller comprises one or more digital filters which are selectively utilized to process the signal based on the mode of operation.

7. The method of claim 5, wherein processing the difference signal through the controller is performed by one or more of an integrator, differentiator, gain device, adder, or comparator.

8. The method of claim 5, wherein monitoring the mode of operation comprises monitoring a voltage converter current.

9. The method of claim 8, wherein monitoring further comprises comparing a voltage converter current to a threshold value.

10. A voltage converter control circuit comprising:
    a feedback loop configured to feedback an output signal;
    an error signal generator configured to generate an error signal based on the output signal;
    a mode detector configured to detect a voltage converter's mode of operation;
    two or more controller components configured for inclusion in the feedback loop based on the mode of operation;
    a selector, responsive to the mode detector, configured to establish one or more controller components selected from the two or more controller components as part of the feedback loop for processing the error signal to generate a charge cycle control signal; and
    a charge cycle controller, responsive to the charge cycle control signal, configured to control a charge cycle of the voltage converter, wherein the one or more controller components comprise a first controller for use during operation in discontinuous conduction mode and a second controller for use during continuous conduction mode.

11. The converter of claim 10, wherein the mode detector comprises a comparator.

12. The converter of claim 11, wherein the comparator is configured to compare a voltage converter current value to a threshold value.

13. The converter of claim 10, wherein the mode detector comprises a current monitor configured to monitor the current through a transistor or switch.

14. The converter of claim 10, wherein the selector comprises one or more switches.

15. A voltage converter for use in a device having wireless receiver, a music player, or both, comprising: a voltage converter circuit, capable of operation in multiple modes of operation, configured to selectively connect to a supply voltage to generate an output voltage to a load, the load part of a device having wireless receiver, a music player, or both;
    a differencing device configured to calculate a difference signal based on the output voltage and a reference voltage;
    a detector configured to detect a mode of operation of the voltage converter circuit;
    a multi-mode controller having continuous conduction mode, critical conduction mode and a discontinuous conduction mode, wherein the multi-mode controller is responsive to the difference signal and the mode of operation detected by the detector, and wherein the controller generates a control signal for the voltage converter circuit which controls a charge cycle duration for the voltage converter.

16. The voltage converter of claim 15, wherein the mode of operation of the multi-mode controller is selected to maintain stability of the voltage converter circuit.

17. The voltage converter of claim 15, wherein the detector comprises a comparator configured to compare a voltage converter current to a threshold value.

18. The voltage converter of claim 15, further comprising one or more switches associated with the multi-mode controller.

19. The voltage converter of claim 18, wherein the one or more switches are configured to be controlled by the detector to selectively control which of the two or more modes of operation the multi-mode controller is operating.

* * * * *